L. R. JONES.
Safety-Stirrups.
No. 139,160. Patented May 20, 1873.
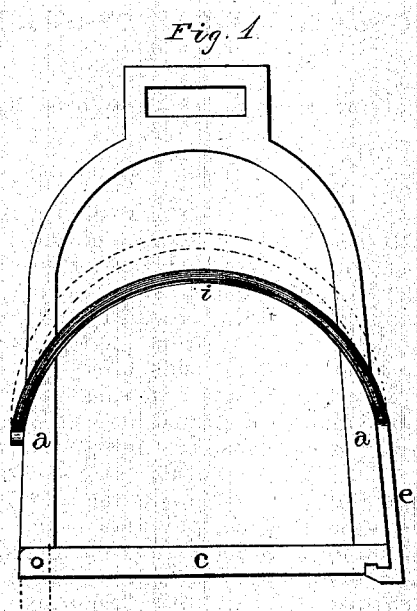
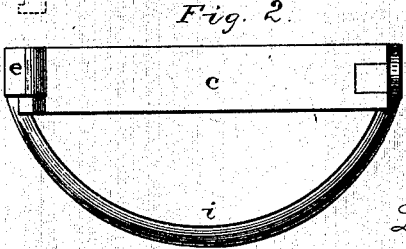

UNITED STATES PATENT OFFICE.

LEMUEL R. JONES, OF CARTHAGE, INDIANA.

IMPROVEMENT IN SAFETY-STIRRUPS.

Specification forming part of Letters Patent No. 139,160, dated May 20, 1873; application filed April 17, 1873.

*To all whom it may concern:*

Be it known that I, LEMUEL R. JONES, of Carthage, in the county of Rush and State of Indiana, have invented certain new and useful Improvements in Safety-Stirrups; and I do hereby declare the following to be a full, clear, and exact description of the invention, such as will enable others skilled in the art to which it pertains to make and use it, reference being had to the accompanying drawing, which forms part of this specification.

The nature of my invention relates to an improvement in stirrups; and consists in a hinged bottom, which is held in position by a catch pivoted to the side, and having a loop extending across the front of the stirrup, until the rider's toe is thrown up against the arm, which withdraws the catch from under the bottom, which immediately opens or falls, and at once releases the foot, as will be more fully described hereafter.

Figure 1 is a front elevation of my invention. Fig. 2 is a bottom view of the same.

$a$ represents the stirrup, having the bottom piece $c$ hinged to it, so that when not supported by the catch $e$, pivoted to the side, it will at once fall and assume the position shown by dotted lines, leaving the bottom of the stirrup entirely free and open. The catch $e$ has a flanged shoulder formed upon its lower end, which catches under the free end of the piece $c$ and supports it in a horizontal position, keeping the bottom of the stirrup closed. Secured to the upper end of this catch is a loop or arm, $i$, which extends across the front of the stirrup, and has its opposite end pivoted to the side.

In case the rider should ever be thrown and his foot catch in the stirrup, as soon as his toes pressed up against the under side of the arm, the catch would be withdrawn from under the bottom part $c$, which would instantly fall and release the foot.

Having thus described my invention, what I claim as new, and desire to secure by Letters Patent, is—

1. A stirrup having an arm or loop extending across its front, to act as a lever for disengaging the hinged bottom, substantially as set forth.

2. The stirrup $a$, bottom $c$, catch $e$, and arm $i$, when the parts are combined to operate as specified.

In testimony that I claim the foregoing I have hereunto set my hand this 8th day of April, 1873.

LEMUEL R. JONES.

Witnesses:
THOMAS J. HOLDING,
ELISHA BINFORD.